(12) United States Patent
Boruff et al.

(10) Patent No.: US 7,621,550 B1
(45) Date of Patent: Nov. 24, 2009

(54) DETACHABLE KICKSTAND SUPPORT WITH MOUNTING BRACKET

(76) Inventors: Andrew Wayne Boruff, 934 N. Independence, Tipton, IN (US) 46072; Michael Atkisson, 934 N. Independence, Tipton, IN (US) 46072

( * ) Notice: Subject to any disclaimer, the term of this patent is extended or adjusted under 35 U.S.C. 154(b) by 0 days.

(21) Appl. No.: 12/187,100

(22) Filed: Aug. 6, 2008

(51) Int. Cl.
 *B62H 7/00* (2006.01)
(52) U.S. Cl. .................................................. 280/293
(58) Field of Classification Search ............... 280/293
 See application file for complete search history.

(56) References Cited

U.S. PATENT DOCUMENTS

| | | | |
|---|---|---|---|
| 3,955,829 A | 5/1976 | Bussler | |
| 3,998,470 A * | 12/1976 | Houston | 280/301 |
| 4,474,387 A | 10/1984 | Maranell et al. | |
| 4,521,031 A | 6/1985 | Huth | |
| 4,768,800 A | 9/1988 | Johns | |
| 5,257,803 A | 11/1993 | Fisher | |
| 5,351,981 A * | 10/1994 | Thomas | 280/301 |
| D427,114 S | 6/2000 | Briere | |
| 6,170,846 B1 * | 1/2001 | Holter | 280/293 |
| 6,340,166 B1 * | 1/2002 | Rethman et al. | 280/293 |
| 6,669,221 B2 | 12/2003 | Leppke et al. | |

* cited by examiner

*Primary Examiner*—Lesley D Morris
*Assistant Examiner*—Tashiana Adams
(74) *Attorney, Agent, or Firm*—Kyle Fletcher

(57) ABSTRACT

The invention is a detachable kickstand support with mounting bracket that includes a kickstand support plate and mounting bracket. The mounting bracket includes a base plate, a front clamp, a rear clamp, retaining block, and corresponding fasteners. The mounting bracket is capable of attaching itself to any frame of any motorcycle or bicycle. The front and rear clamp have a rubber lining that prevents the finish of the frame from being scratch or marred. The kickstand support plate has a channel that enables it to be used with most styles of kickstands. The kickstand support plate is secured to the mounting bracket via the retaining block, which utilizes a spring-loaded ball bearing that interacts with a dimple on the kickstand support plate as the securing means.

7 Claims, 5 Drawing Sheets

DETACHABLE KICKSTAND SUPPORT WITH MOUNTING BRACKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of motorcycle kickstands, more specifically, a kickstand support with mounting bracket.

B. Discussion of the Prior Art

As a preliminary note, it should be stated that there is an ample amount of prior art that deals with kickstand supports. As will be discussed immediately below, no prior art discloses a kickstand support that has a mounting bracket to support said support when not in use.

The Leppke et al. Patent (U.S. Pat. No. 6,669,221) discloses a motorcycle kickstand anti-sink attachment having means to attach to an existing kickstand. However, the kickstand support does not have a mounting bracket that attaches to an existing motorcycle frame from which the kickstand support can be easily retained or removed for use.

The Fisher Patent (U.S. Pat. No. 5,257,803) discloses a supportive plate having a U-shaped channel for receiving a kickstand foot for providing support. However, the supportive plate does not attach or detach from a mounting bracket, which can be installed upon any motorcycle frame.

The Johns Patent (U.S. Pat. No. 4,768,800) discloses an auxiliary pad for attaching to a kickstand. However, the auxiliary pad does not slide upon a kickstand, nor does it include an attaching bracket to support said plate when not in use.

The Thomas Patent (U.S. Pat. No. 5,351,981) discloses a kickstand attachment. However, the kickstand attachment does not slidably disengage from the kickstand, nor does it attach or detach from a mounting bracket for storage purposes when not in use.

The Huth Patent (U.S. Pat. No. 4,521,031) discloses a standpad for use with a motorcycle kickstand. Again, the stand pad does not engage or disengage from a supporting bracket that attaches to any motorcycle frame.

The Briere Patent (U.S. Pat. No. Des. 427,114) illustrates a design for a motorcycle kickstand plate, which does not depict an attaching plate.

The Maranell et al. (U.S. Pat. No. 4,474,387) discloses a kickstand supporting device. However, the device shown does not include a mounting bracket that can clamp onto any motorcycle frame, which stores the kickstand plate when not in use.

The Bussler Patent (U.S. Pat. No. 3,955,829) discloses a kickstand support pad having a socket for receiving a kickstand peg. Again, the kickstand support pad does not have a mounting bracket that can clamp onto any frame of a motorcycle or bicycle, and of which stores the kickstand support pad when not in use.

While the above-described devices fulfill their respective and particular objects and requirements, they do not describe a detachable kickstand support with mounting bracket that provides for the advantages of the detachable kickstand support with mounting bracket. In this regard, the detachable kickstand support with mounting bracket departs from the conventional concepts and designs of the prior art.

SUMMARY OF THE INVENTION

The invention is a detachable kickstand support with mounting bracket that includes a kickstand support plate and mounting bracket. The mounting bracket includes a base plate, a front clamp, a rear clamp, retaining block, and corresponding fasteners. The mounting bracket is capable of attaching itself to any frame of any motorcycle or bicycle. The front and rear clamp have a rubber lining that prevents the finish of the frame from being scratch or marred. The kickstand support plate has a channel that enables it to be used with most styles of kickstands. The kickstand support plate is secured to the mounting bracket via the retaining block, which utilizes a spring-loaded ball bearing that interacts with a dimple on the kickstand support plate as the securing means.

It is an object of the invention to provide a kickstand support plate that has an accompanying mounting bracket to support the kickstand support plate when not in use.

A further object of the invention is to provide a mounting bracket that is easy to install upon the frame of a motorcycle or bicycle.

A further object of the invention is to provide a mounting bracket that does not scratch or mar the finish of the frame upon which it is mounted.

These together with additional objects, features and advantages of the detachable kickstand support with mounting bracket will be readily apparent to those of ordinary skill in the art upon reading the following detailed description of presently preferred, but nonetheless illustrative, embodiments of the detachable kickstand support with mounting bracket when taken in conjunction with the accompanying drawings.

In this respect, before explaining the current embodiments of the detachable kickstand support with mounting bracket in detail, it is to be understood that the detachable kickstand support with mounting bracket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the detachable kickstand support with mounting bracket. It is therefore important that the claims be regarded as including such equivalent construction insofar as they do not depart from the spirit and scope of the detachable kickstand support with mounting bracket. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
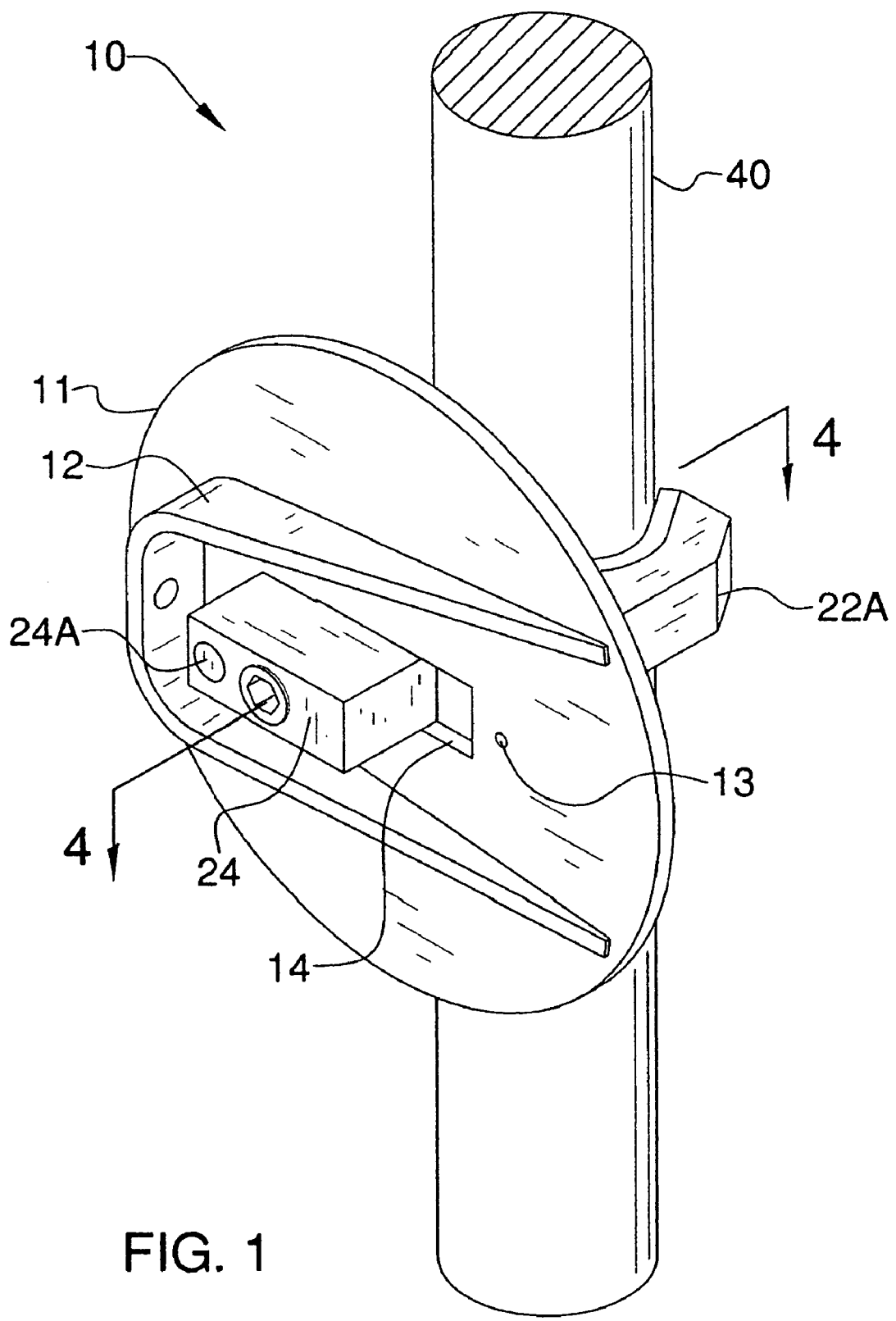
FIG. 1 illustrates a front, isometric view of the kickstand support plate secured to the mounting bracket, which is Installed upon a frame.
Figure 2:
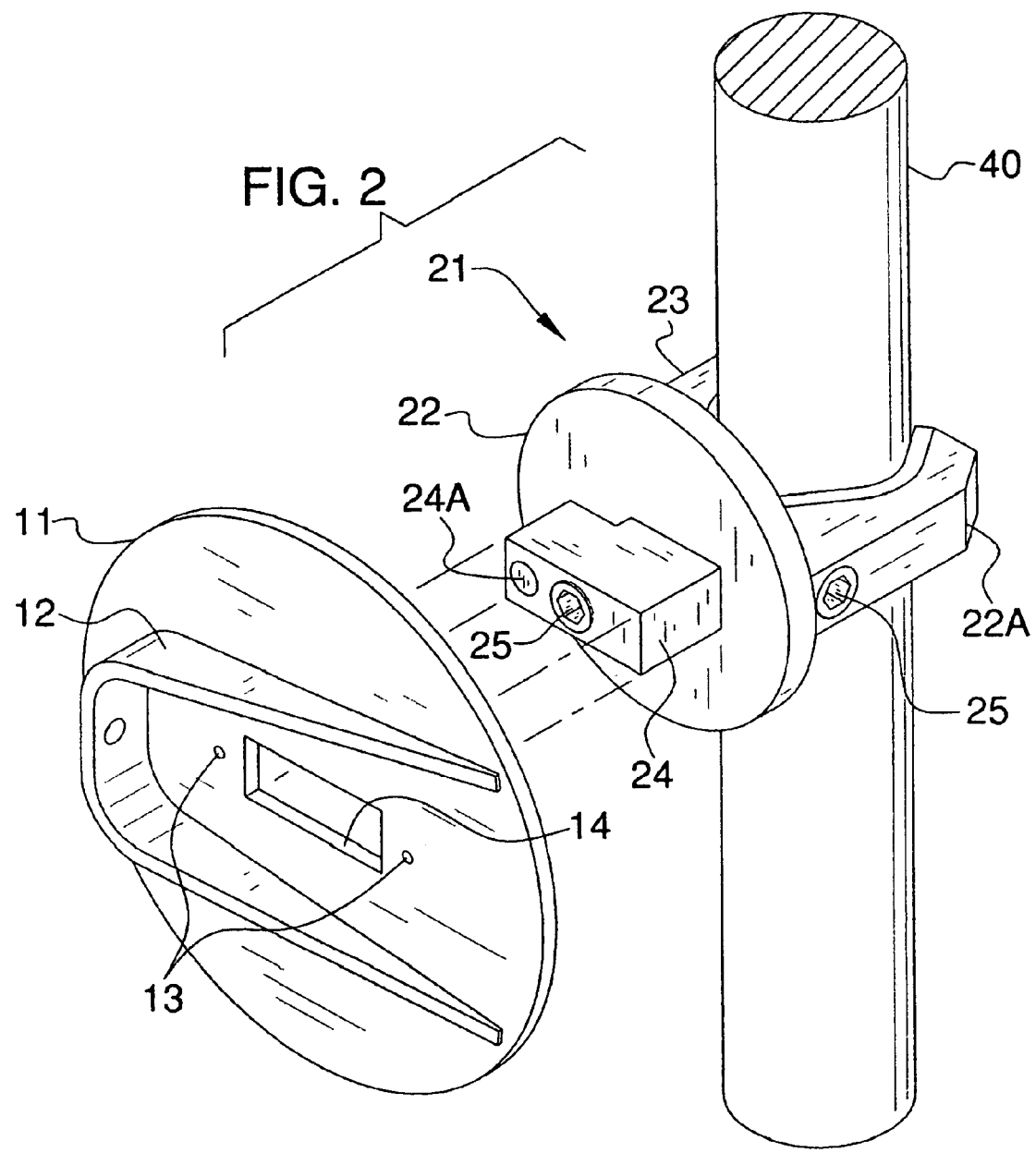
FIG. 2 illustrates an exploded view of the kickstand support plate and the mounting bracket, which is secured to the frame.
Figure 3:
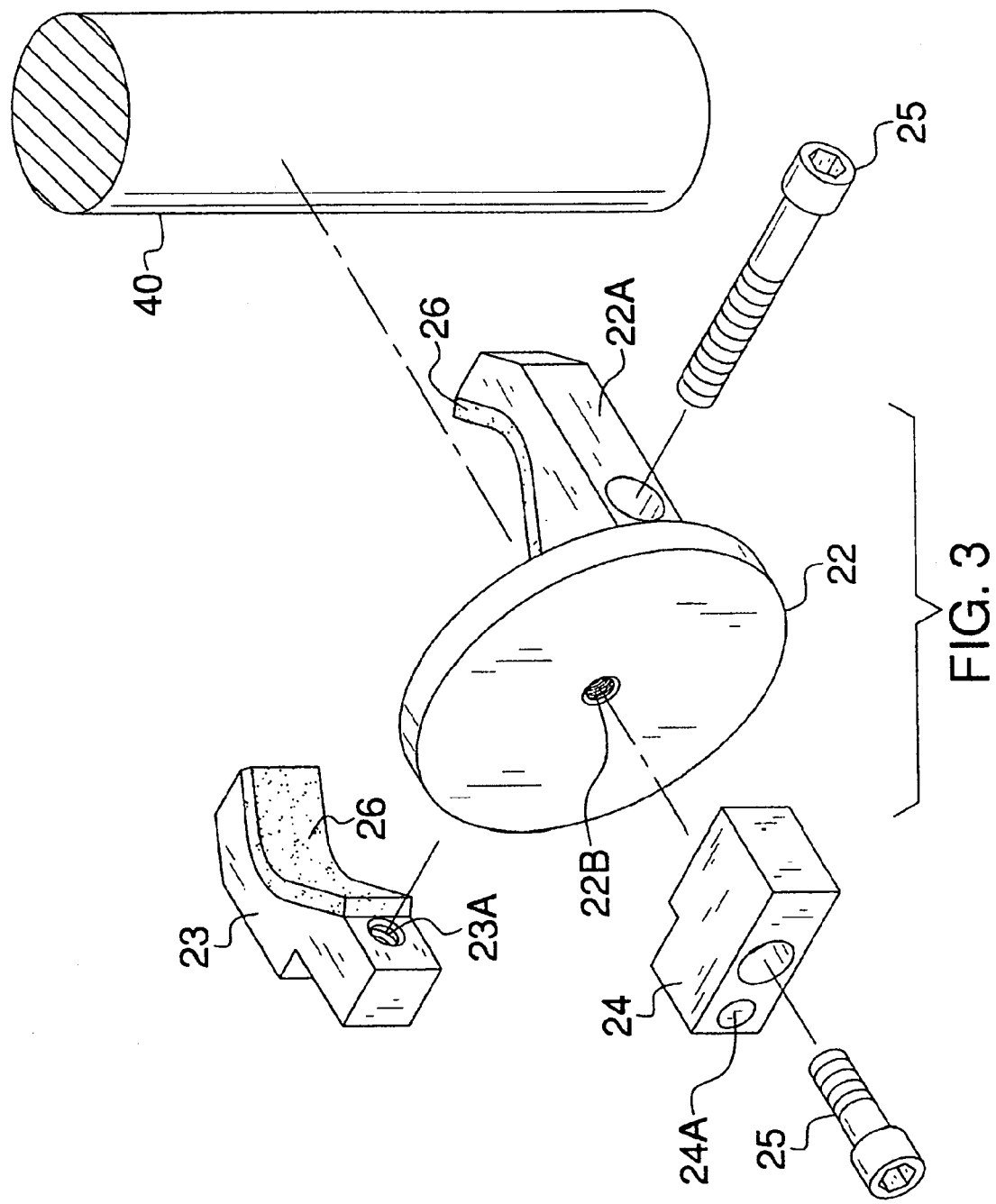
FIG. 3 illustrates an exploded view of the mounting bracket and the frame.
Figure 4:
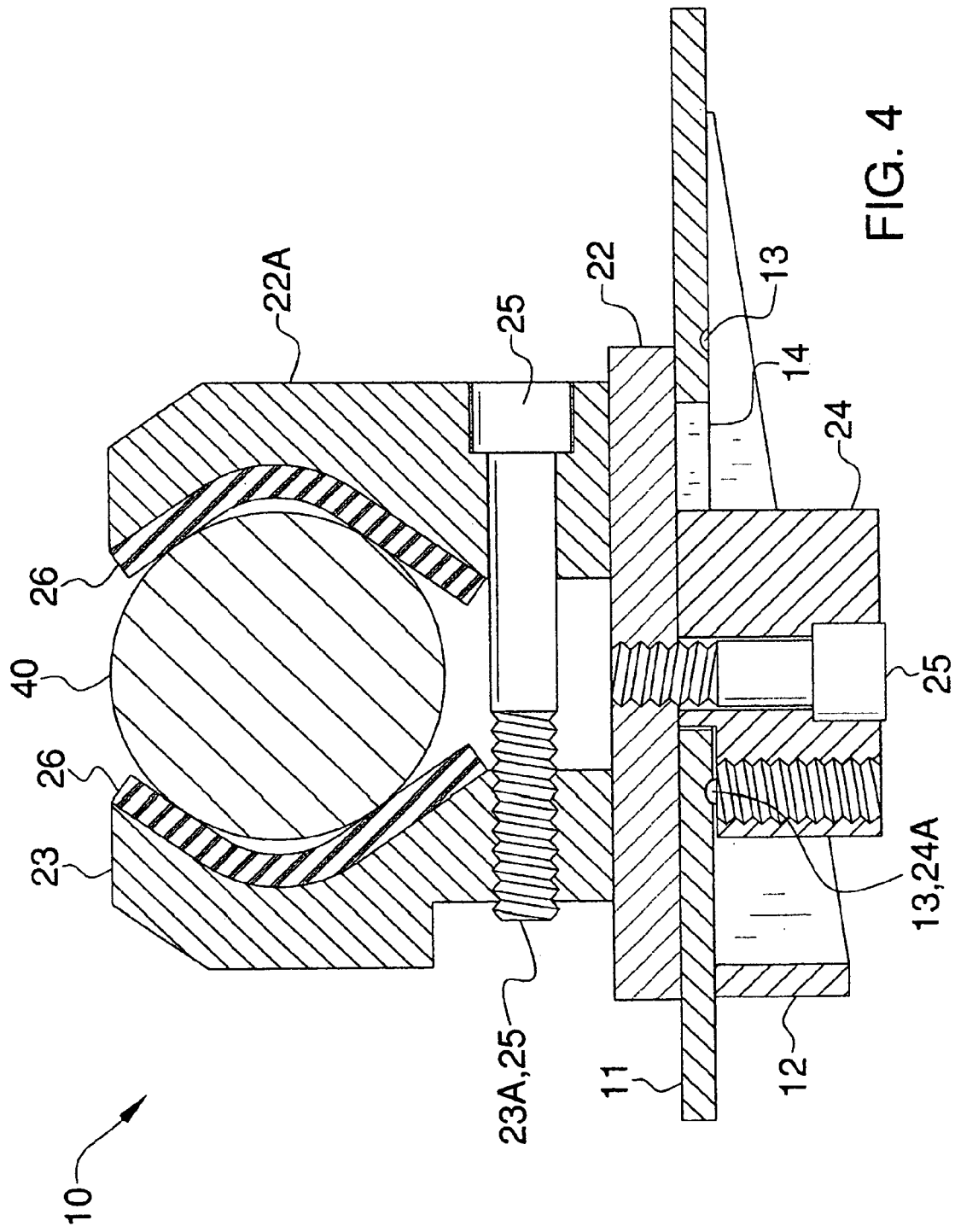
FIG. 4 illustrates a detailed cross-sectional view of the mounting bracket, kickstand support plate, and the frame along line 4-4 in FIG. 1.
Figure 5:
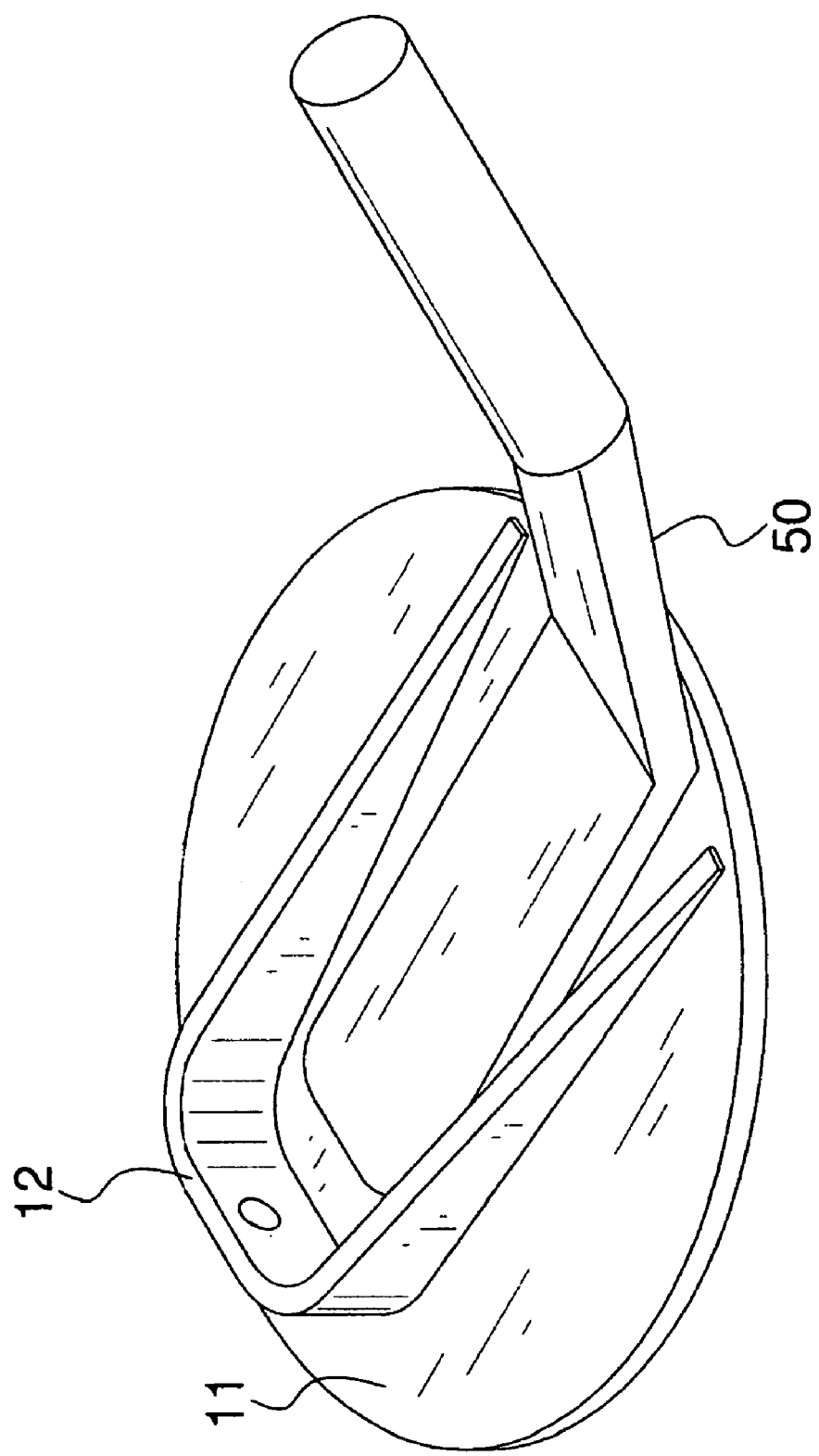
FIG. 5 illustrates the kickstand support plate in use with a kickstand.

Detailed reference will now be made to the preferred embodiment of the present invention, examples of which are illustrated in FIGS. 1-5. A detachable kickstand support with mounting bracket 10 (hereinafter invention) includes a kickstand support plate 11, and a mounting bracket 21.

The kickstand support plate 11 has a U-shaped channel 12 that rises along the length of the U-shaped channel 12. The kickstand support plate 11 also has a plurality of dimples 13. The kickstand support plate has a retaining block opening 14. The kickstand support plate 11 is made of solid construction that is capable of withstanding the loads associated with the use of a kickstand 50, such that when in use the kickstand support plate 11 will not deform. The kickstand support plate 11 is capable of spreading out the load associated with the kickstand 50 to the surrounding ground.

The mounting bracket 21 is comprised of a base plate 22, a back clamp 23, a retaining block 24, and a plurality of screws 25. The base plate 22 has a front clamp 22A that works in tandem with the back clamp 23 in order to provide a means of securing the mounting bracket 21 to a frame 40 of a motorcycle or bicycle.

The interior surface of both the back clamp 23 and the front clamp 22A are adorned with an absorbent material 26 that diminishes or prevents the scratching or marring of the finish on the frame 40. Said absorbent material comprises rubber, viscoelastic foam, a soft plastic, or a soft wood.

The back clamp 23 has a screw hole 23A with internal threading. The front clamp 22A and the back clamp 23 secure to each other via a screw 25.

The side opposite the front clamp 22A of the base plate 22 is of round construction, with a screw hole 22B. The retaining block 24 is secured to the base plate 22 via a screw 25 and the corresponding screw hole 22B.

The retaining block 24 has a spring-loaded ball bearing 24A, which interacts with one of the dimples 13 to secure the kickstand support plate 11 in place with respect to the mounting bracket 21.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A detachable kickstand support with mounting bracket comprising:
    a mounting bracket that attaches upon a frame of a motorcycle or bicycle, wherein said mounting bracket has a kickstand support plate attaching means, wherein said mounting bracket attaches to the frame of a motorcycle or bicycle by a front clamp and rear clamp both of which have along an interior surface a soft material;
    a kickstand support plate comprised of a U-shaped channel for supporting a kickstand of a motorcycle or bicycle on a soft surface, and wherein said kickstand support plate attaches to the kickstand support plate attaching means when not in use
    said kickstand support plate attaching means further comprises a retaining block having a spring-loaded ball bearing that works in conjunction with a dimple on the kickstand support plate to lock the kickstand support plate in place with respect to the mounting bracket.

2. The detachable kickstand support with mounting bracket as described in claim 1 wherein the soft material comprises rubber, a soft plastic, viscoelastic foam, or a soft wood.

3. The detachable kickstand support with mounting bracket as described in claim 1 wherein the kickstand support plate has a plurality of dimples.

4. The detachable kickstand support with mounting bracket as described in claim 1 wherein the kickstand support plate has a U-shaped channel in order to secure a kickstand of a motorcycle or bicycle in place with respect to the kickstand support plate when in use.

5. A detachable kickstand support with mounting bracket comprising:
    a mounting bracket that attaches upon a frame of a motorcycle or bicycle, wherein said mounting bracket has a kickstand support plate attaching means, wherein said mounting bracket attaches to the frame of a motorcycle or bicycle by a front clamp and rear clamp both of which have along an interior surface a soft material;
    a kickstand support plate comprised of a U-shaped channel for supporting a kickstand of a motorcycle or bicycle on a soft surface, and wherein said kickstand support plate attaches to the kickstand support plate attaching means when not in use, and wherein said kickstand support plate has a plurality of dimples;
    said kickstand support plate attaching means further comprises a retaining block having a spring-loaded ball bearing that works in conjunction with one of said dimples on the kickstand support plate to lock the kickstand support plate in place with respect to the mounting bracket.

6. The detachable kickstand support with mounting bracket as described in claim 5 wherein the soft material comprises rubber, a soft plastic, viscoelastic foam, or a soft wood.

7. The detachable kickstand support with mounting bracket as described in claim 5 wherein the kickstand support plate has a U-shaped channel in order to secure a kickstand of a motorcycle or bicycle in place with respect to the kickstand support plate when in use.

* * * * *